United States Patent [19]

Old

[11] 4,065,009
[45] Dec. 27, 1977

[54] MATERIAL HANDLING APPARATUS

[75] Inventor: John L. Old, Kenilworth, England

[73] Assignee: Massey-Ferguson Services N.V., Curacao, Netherlands

[21] Appl. No.: 610,363

[22] Filed: Sept. 4, 1975

[30] Foreign Application Priority Data

Sept. 19, 1974 United Kingdom ............ 40828/74

[51] Int. Cl.² .............................................. E02F 3/72
[52] U.S. Cl. ................................. 214/131 A; 172/274
[58] Field of Search ...... 214/131 A, 145 A, DIG. 12; 172/272, 273, 274, 275

[56] References Cited

U.S. PATENT DOCUMENTS

| 3,043,375 | 7/1962 | Astrom | 214/131 A X |
| 3,324,954 | 6/1967 | Westendorf | 214/131 A X |
| 3,612,311 | 10/1971 | Eidy | 214/131 A X |
| 3,833,136 | 9/1974 | Spicer et al. | 214/131 A |
| 3,863,786 | 2/1975 | Frank | 214/131 A |
| 3,912,095 | 10/1975 | Miller | 214/131 A |
| 3,939,997 | 2/1976 | Frank | 214/131 A |

FOREIGN PATENT DOCUMENTS

| 238,098 | 5/1964 | Austria | 214/131 A |
| 574,626 | 4/1959 | Canada | 214/131 A |
| 1,248,551 | 8/1967 | Germany | 214/131 A |
| 882,328 | 7/1953 | Germany | 172/275 |

Primary Examiner—Lawrence J. Oresky
Assistant Examiner—Ross Weaver
Attorney, Agent, or Firm—Robert L. Farris

[57] ABSTRACT

Quick attach front end loader for an agricultural tractor. Loader has a pair of laterally spaced longitudinal rod members at each side. Tractor has sockets and guides to receive the rod members. The loader becomes supported on the tractor merely by driving tractor forwards until the rod members are received in the sockets. The lateral spacing of the sockets gives structural rigidity while minimizing obstruction of view from tractor cab when the loader is detached.

7 Claims, 3 Drawing Figures

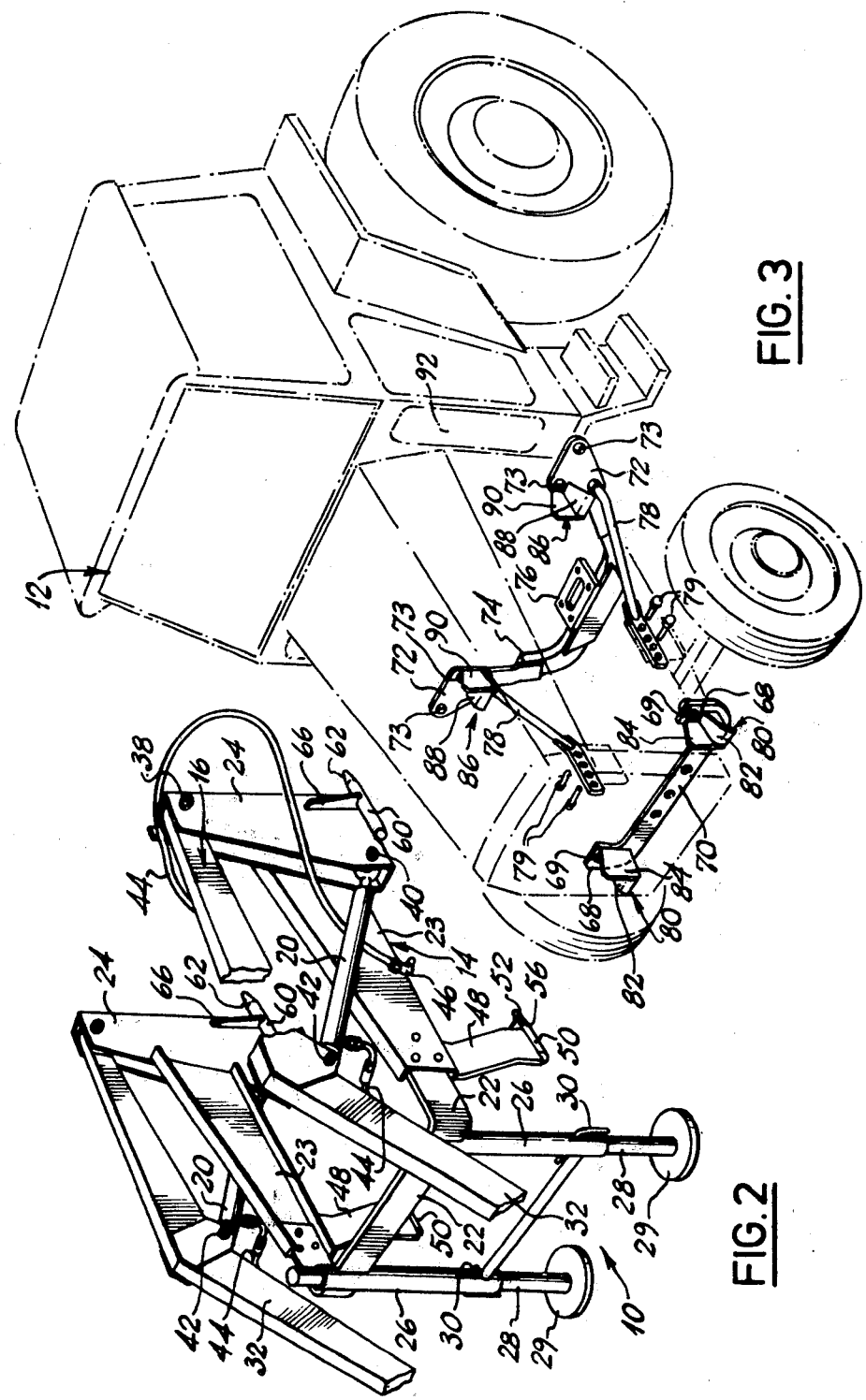

MATERIAL HANDLING APPARATUS

This invention relates to material handling apparatus and in particular, though not exclusively, to such apparatus in the form of a loader for attachment at the front of an agricultural tractor. Such apparatus is usually provided with a variety of interchangeable material handling implements such as a manure fork, a bucket and a silage grab.

An important feature of an agricultural loader is that it should be a quick and easy operation to mount it on and detach it from a tractor. The loader then need be carried by the tractor only when the loader is in use. A further requirement is that the structure which supports the loader on the tractor, in addition to being easily detachable, should when attached to the tractor provide sufficient strength and rigidity so that for example, the loader can be driven over uneven ground when carrying its maximum load in an elevated position, without the load swaying unduly.

Several loaders have been proposed to meet these requirements, but none of them is entirely satisfactory.

For example, there is the loader proposed in U.S. Pat. No. 3,324,954. This requires the use of the boom lift rams to move and align the loader relative to the tractor when attaching and detaching the loader. Accordingly, in the case of a tractor having a cab, after the driver has dismounted from his cab to connect the hydraulic hoses, he must remount to his cab in order to position the loader on the tractor, since from the ground he cannot easily reach the spool valve which controls the hydraulic pump. Consequently the loader has to be provided with remote control apparatus for the locking means which locks the loader in position on the tractor, in order to avoid the need for the driver to dismount again after he has positioned the loader on the tractor. Further factors are that very long hydraulic hoses are needed to reach from the tractor to the loader because the hydraulic connections have to be made with the loader considerably spaced from its working position, and that the loader's structure is somewhat large.

Other loaders have been proposed in which simpler methods of attachment are employed but in each case it is found that the structure employed either provides insufficient structural rigidity (particularly with respect to lateral swaying of a load carried by the loader) or else the structure which remains on the tractor after the loader has been removed, unduly obstructs the driver's view of the region around the front wheels of the tractor — which is a disadvantage when the tractor is being used for other operations such as ploughing.

An object of the invention is to provide a loader which can be attached to and detached from a tractor in a simple manner without the use of the tractor's hydraulic system and which can provide adequate lateral rigidity when in use with a minimum of obstruction of the driver's view when the main part of the loader is detached from the tractor.

According to the invention there is provided material handling apparatus as defined in claim 1 of the accompanying claims. Further important features of the invention are defined in the sub-claims.

An embodiment of the invention will now be described by way of example with reference to the accompanying drawings in which:

FIG. 2 is a perspective view from the front, above and to one side of the loader of FIG. 1, with a portion thereof removed; and FIG. 3 is a perspective view of a series of attachment elements to be secured to a tractor (shown in chain dot lines), whereby the loader of FIGS. 1 and 2 can be rapidly attached-to and detached from the tractor.

Figure 1:
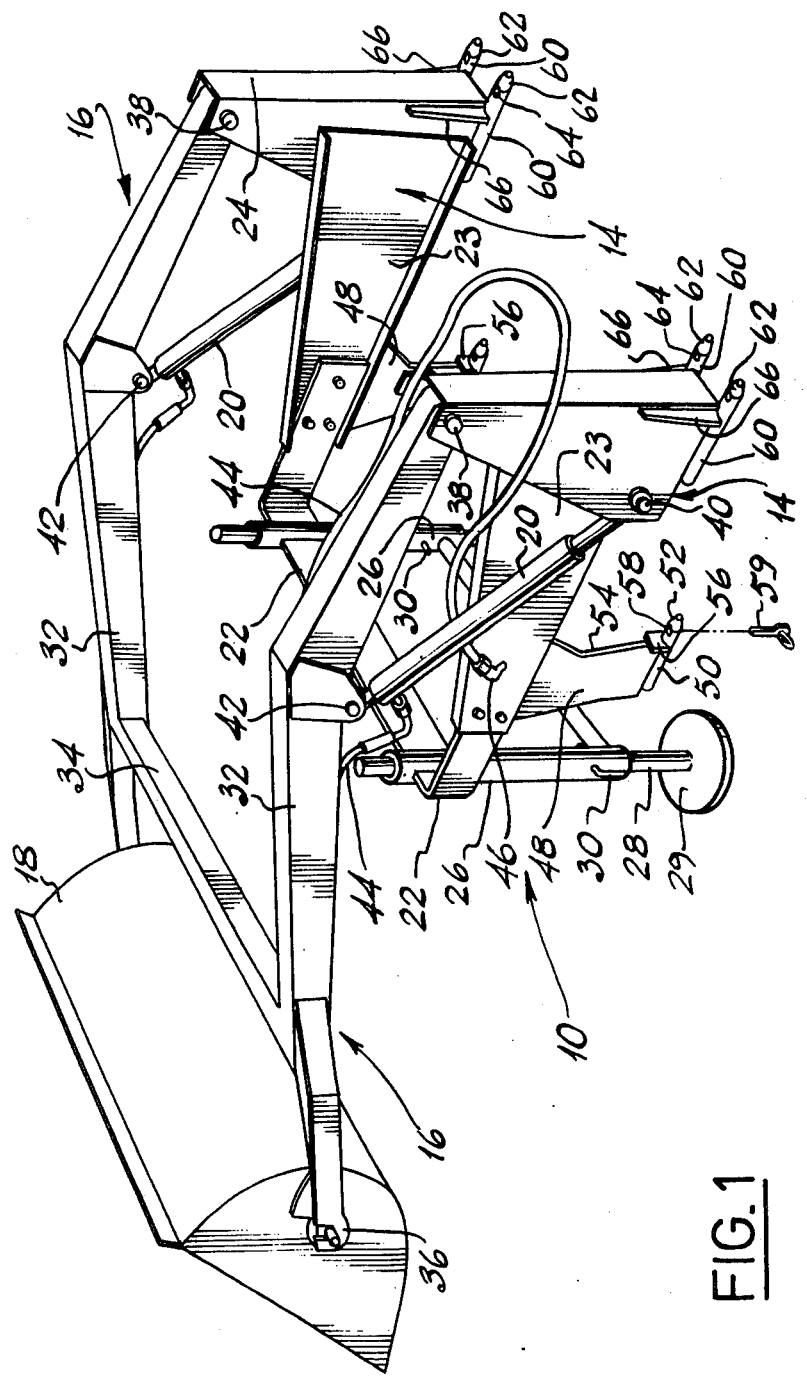
FIG. 1 is a perspective view from the rear, above, and to one side, of a loader for attachment to an agricultural tractor.

As shown in the drawings, material handling apparatus in the form of a loader 10 for attachment to a tractor 12 comprises a U-shaped support structure 14, a boom 16, a material handling implement in the form of a bucket 18, and a thrust device comprising a pair of hydraulic rams 20 which operate in unison.

Support structure 14 comprises a rigid U-shaped frame 22 having side arms 23 to fit round the front of tractor 12, and a pair of upright pivot posts 24 fixed to the ends of the arms of the frame.

Frame 22 has a parking stand at the front. The parking stand comprises fixed legs 26 braced by a strut 27, and a pair of adjustable legs 28 having feet 29 are slidingly received in legs 26 and set at a desired extension by means of adjustment pins 30 which extend through aligned holes in the fixed legs and any one of a series of spaced holes in the adjustable legs.

Boom 16 comprises a pair of rigid beams 32 connected by a strut 34 to form an H-shaped structure. Bucket 18 is pivotally mounted on hooks 36 formed at the ends of beams 32, in the usual manner. A latch (not shown), releasable from the tractor cab, is provided to retain the bucket in the position shown in FIG. 1.

The other end of each beam 32 is pivotally connected by a pin 38 to its respective pivot post 24.

Hydraulic rams 20 are each connected at the piston rod end by respective pivot pins 40 to pivot posts 24, and at the cylinder end by respective pivot pins 42 to the beams 32. The rams are connected in parallel by hoses 44 having a hydraulic inlet connector 46 which allows rapid connection to the tractor's hydraulic system, and which prevents escape of hydraulic fluid upon disconnection therefrom.

In order that the loader 10 may be attached-to and detached from tractor 12 rapidly and easily, two attachment means each comprising three pairs of interengageable attachment elements are provided, one attachment means for each side of U-shaped frame 22. Each attachment means comprises two pairs of laterally spaced attachment elements at the rear end of frame 22, and one further pair of attachment elements spaced longitudinally therefrom at the forward end of frame 22. Each pair of attachment elements comprises a rod member secured to frame 22 and structure defining a socket fastened to tractor 12.

As shown in FIGS. 1 and 2, frame 22 has fixed thereto a pair of downwardly extending support plates 48 one each side of the frame. Each support plate has secured thereto at its lower edge a longitudinally extending forward rod member 50 formed with a tapered portion 52 at its rear end. The rod member projects rearwards about 1½ to 2 inches from the rear edge 54 of support plate 48. A transverse abutment plate 56 is welded to the support plate and to the rod member for a purpose to be described. A vertical bore or aperture 58 is formed in the rod at the edge of tapered portion 52 to receive a locking member in the form of a lynch pin 59.

Four rearward rod members 60 are provided at the rear of frame 22, one pair of laterally spaced rod members secured to the bottom edges of each pivot post 24. Each rod member 60 is similar in structure to the rod members 50, having a tapered portion 62 and an aperture 64 for a lynch pin (not shown). Each rod member also has an abutment plate 66 welded to it and to the pivot post, corresponding to the abutment plates 56.

The structures defining six sockets to receive the rod members 50, 60 are shown in FIG. 3. Two forward socket members 68 each formed with a single socket 69 are each mounted on a front transverse bracket 70 bolted to the frame of tractor 12. Two rearward socket members 72 each formed with a pair of laterally spaced sockets 73 are each carried by a U-shaped bracket 74 fastened to the underside of the tractor by bolts (not shown) extending through an apertured plate 76. A pair of forwardly converging tie bars 78, one at each side of the tractor, are each fastened at one end by nuts to their respective socket member 72 and are each fastened at their forward end to the tractor by bolts 79.

A guide structure 80 is provided for each forward socket member 68 to guide its respective rod member 50 into the socket 69. Each guide member has a sloping base flange 82 forming a ramp and providing vertical guidance, and a side flange 84 providing lateral guidance. A similar guide structure 86 is provided for the inner socket 73 of each rearward socket member 72, comprising a sloping base flange 88 and a side flange 90.

In use, the rod members 50 and 60 are received in the sockets 69 and 73 respectively and locked in position by insertion of at least one lynch pin 59 on each side of the tractor into the apertures 58 or 64. The rod members 50 and 60 and socket members 68 and 72 support the entire weight of the loader apart, of course, from the structure shown in FIG. 3. The loader boom and bucket are operated in the usual manner.

In order to detach the loader from the tractor, the operater lowers bucket 18 so that it rests on the ground, dismounts from the tractor, removes the lynch pins 59 from their sockets in rod members 50, 60, lowers the legs 28 of the parking stand and disconnects hydraulic connector 46 from the tractor and also disconnects the trip (not shown) from the bucket latch. The operator then backs the tractor away from the loader. This is all that is required to detach the loader. The loader is left supported by its parking stand ready to be re-attached to the tractor.

To mount the loader on the tractor the above sequence of operations is reversed. The stand supports the loader in the position in which it was left so that when the tractor is driven forwards directly towards the loader, the rod members 50, 60 are approximately axially aligned with their respective sockets. As the tractor moves forwards, the rod members are guided by the flanges 82, 84, 88, 90 upwardly into the sockets 69 and 73, so that the weight of the loader becomes supported by the tractor. The abutment plates 56 and 66 engage the socket members. Then, all that is required is the insertion of the lynch pins and the connection of the hydraulic system and the bucket latch in the usual way.

An important advantage of the embodiment of the invention described above lies in the fact that when mounting the loader on a tractor, the act of driving the tractor into the U-shaped frame 22 and thereby inserting the rod members into the socket members is all that is required to attach the loader to the tractor. The weight of the loader is then supported by the tractor. The tractor driver has not had to move from his seat nor has it been necessary to use the loader lift rams. All that is then required is the insertion of a couple of lynch pins and the connection of the usual mechanical and hydraulic services and the loader is ready for use. Thus, mounting and dismounting of the loader is a simple matter.

A further advantage is that very little structure of the loader remains permanently attached to the tractor i.e. only those parts shown in FIG. 3. Furthermore, the provision of two laterally spaced rod members 60 and corresponding sockets 73 for each of the posts 24 provides two advantages. Firstly, it gives these posts great lateral rigidity, thereby avoiding undue swaying of the boom 16 when the tractor carries a load in the raised position over uneven ground. Secondly because sockets 73 are spaced laterally rather that vertically, this structural rigidity is achieved without sacrificing any significant amount of visibility through the cab foot-height windows 92 when the loader is detached — an important point for ploughing.

It is to be understood that the terms "rod member" and "socket member" as used in this specification are not limited to the shapes and forms of these members illustrated in the above specific embodiment. The rod members can be shorter than those shown for, of course, only about 1½ to 2 inches of the rod members in the above embodiment project rearwards from the abutment or stop plates 56, 66. Only this portion can enter the socket members. Generally any form of male/female fastening capable of taking the loads involved may be employed.

Furthermore, it is not essential that the forward attachment means constituted in the above embodiment by rod members 50 and sockets 69 be in that form. Any coupling which will locate the forward end of frame 22 against vertical movement when attached to the tractor will suffice.

Also, many other forms of parking stand may be used in place of the one employed in the above embodiment.

The loader may be used for industrial purposes e.g. roadbuilding operations, as well as in agriculture.

What we claim is:

1. Material handling apparatus for attachment to a tractor, the apparatus comprising:
   a U-shaped support structure to fit round the front end of a tractor;
   a pair of posts forming part of said support structure and rigidly secured thereto so as to extend upwardly when the apparatus is attached to a tractor;
   a boom, said boom being pivotally mounted at one end on each of said posts, the other end of the boom being adapted to have mounted thereon a material handling implement;
   a thrust device connected to the boom, said thrust device being operable to effect pivotal movement of the boom relative to the posts;
   attachment means at each side of said support structure whereby the support structure may be attached to and detached from a tractor; and
   a stand connected to the support structure and operable to support the material handling apparatus when said apparatus is detached from a tractor;
   characterized in that each of said attachment means comprises two laterally spaced pairs of attachment elements, each pair of attachment elements comprising a rod member secured to said support structure in the region of the lower end of its respective post and structure defining a socket fastenable to a tractor, the rod members extending longitudinally of a tractor when mounted thereon; and that said rod members and said structures defining said sockets are mounted in positions such that said stand supports the material handling apparatus in a position so that said rod members are approximately axially aligned with said sockets whereby the only operations required for attachment of said apparatus to the tractor is driving the tractor toward the apparatus and inserting retaining pins; and that a guide structure is mounted adjacent at least one of said attachment means, the guide structure being engageable with at least one of its respective rod members upon forward movement of a tractor on which the apparatus is to be mounted, the guide structure being effective to guide said rod member into its respective socket; and that at least two of said structures defining a socket are formed integrally with a U-shaped bracket one at each end thereof, the U-shaped bracket being proportioned so as to pass underneath a tractor and being adapted to be fastened thereto.

2. Material handling apparatus according to claim 1 characterized in that said attachment means comprises two further pairs of attachment elements, one pair at each side of said support structure, each of said further pairs of attachment elements being spaced longitudinally with respect to the tractor of the other two pairs of attachment elements on the same side of the support structure.

3. Material handling apparatus according to claim 2 characterized in that each of said further pairs of attachment elements is located forwardly of the other two pairs of attachment elements on the same side of the support structure.

4. Material handling apparatus according to claim 2 characterized in that said further pairs of attachment elements comprise rod members and structures defining sockets.

5. Material handling apparatus according to claim 1 characterized in that said guide structure comprises flanges providing both vertical and lateral guidance for said rod members into said sockets, and that said rod members have tapered ends.

6. Material handling apparatus according to claim 2 characterized in that at least one of said rod members is formed with an aperture, a locking member being provided for insertion into the aperture after the apertured portion of the rod member has passed through its respective socket.

7. Material handling apparatus according to claim 1 characterized by tie members each secured at one end to the U-shaped bracket adjacent the structure defining the sockets and extending longitudinally with respect to a tractor and each being adapted at its other end to be fastened to a tractor.

* * * * *